United States Patent
Seo et al.

(10) Patent No.: US 11,582,742 B2
(45) Date of Patent: *Feb. 14, 2023

(54) METHOD FOR TRANSMITTING AND RECEIVING CONTROL INFORMATION OF A MOBILE COMMUNICATION SYSTEM

(71) Applicant: Electronics and Telecommunications Research Institute, Daejeon (KR)

(72) Inventors: Bang-Won Seo, Daejeon (KR); Young-Jo Ko, Daejeon (KR); Tae-Gyun Noh, Daejeon (KR); Jae-Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,495

(22) Filed: Jun. 14, 2021

(65) Prior Publication Data

US 2021/0306989 A1     Sep. 30, 2021

Related U.S. Application Data

(63) Continuation of application No. 16/659,680, filed on Oct. 22, 2019, now Pat. No. 11,224,036, which is a (Continued)

(30) Foreign Application Priority Data

| Jun. 7, 2011 | (KR) | 10-2011-0054668 |
| Jun. 14, 2011 | (KR) | 10-2011-0057653 |
| Jul. 19, 2011 | (KR) | 10-2011-0071701 |

(51) Int. Cl.
*H04W 72/04* (2009.01)
*H04L 5/00* (2006.01)
*H04W 72/0446* (2023.01)

(52) U.S. Cl.
CPC ......... *H04W 72/042* (2013.01); *H04L 5/0035* (2013.01); *H04L 5/0053* (2013.01); *H04W 72/0446* (2013.01)

(58) Field of Classification Search
CPC ... H04L 5/0007; H04L 5/0053; H04L 5/0051; H04L 2025/03426; H04L 25/03343;
(Continued)

(56) References Cited

U.S. PATENT DOCUMENTS

| 2009/0088148 A1* | 4/2009 | Chung | H04L 1/0032 |
| | | | 455/423 |
| 2011/0105136 A1* | 5/2011 | Choi | H04W 48/08 |
| | | | 455/452.1 |

(Continued)

FOREIGN PATENT DOCUMENTS

| EP | 2 302 830 A2 | 3/2011 |
| JP | 2012-235353 A | 11/2012 |

(Continued)

OTHER PUBLICATIONS

International Search Report dated Dec. 18, 2012 in counterpart International Application No. PCT/KR2012/004496 (5 pages, in Korean, with English translation).

(Continued)

*Primary Examiner* — Jung Liu
(74) *Attorney, Agent, or Firm* — Insight Law Group, PLLC; Seung Lee

(57) ABSTRACT

The method for transmitting control information in a mobile communication system includes: determining a control channel resource for transmitting control information by means of the data channel region; and transmitting the control information using the determined control channel resource. A capacity for control information, which increases for multiple user multiple-input multiple-out (MI-
(Continued)

MOs) in a heterogeneous network environment, for heterogeneous network interference control using carrier aggregation, for frequent use of a multicast-broadcast single frequency network (MBSFN) subframe, and for a CoMP transmission control, may be satisfied. Further, an adaptive resource allocation based on a requested capacity for control information may be enabled, and the efficient utilization of resources may also be enabled.

18 Claims, 6 Drawing Sheets

Related U.S. Application Data continuation of application No. 15/814,015, filed on Nov. 15, 2017, now Pat. No. 10,462,776, which is a continuation of application No. 15/289,132, filed on Oct. 8, 2016, now Pat. No. 9,839,026, which is a continuation of application No. 14/124,404, filed as application No. PCT/KR2012/004496 on Jun. 7, 2012, now Pat. No. 9,497,749.

(58) Field of Classification Search
CPC ............. H04W 72/042; H04W 72/046; H04W 72/082; H04W 52/38; H04W 52/325; H04W 52/44
See application file for complete search history.

(56) References Cited

U.S. PATENT DOCUMENTS

| | | | |
|---|---|---|---|
| 2011/0170496 A1* | 7/2011 | Fong | H04W 52/24 370/329 |
| 2011/0249633 A1* | 10/2011 | Hong | H04W 72/042 370/328 |
| 2011/0268062 A1* | 11/2011 | Ji | H04J 11/005 370/329 |
| 2011/0274066 A1* | 11/2011 | Tee | H04W 72/0453 370/328 |
| 2012/0106465 A1* | 5/2012 | Haghighat | H04L 1/1829 370/329 |
| 2014/0086189 A1 | 3/2014 | Takeda et al. | |

FOREIGN PATENT DOCUMENTS

| | | |
|---|---|---|
| KR | 10-2011-0020732 A | 3/2011 |
| WO | 2010/053984 A2 | 5/2010 |
| WO | 2010/076300 A1 | 7/2010 |
| WO | 2011/037439 A2 | 3/2011 |

OTHER PUBLICATIONS

Samsung: "PDCCH Extention for ICIC and Capacity Gains", 3GPP Draft; R1-103046 PDCCH ICIC, 3rd Generation Partnership Project (3GPP) TSG RAN WG1 #61, XP050420138, May 10-14, 2010 (2 pages).

Huawei, "Search Space for the R-PDCCH", 3GPP TSG RAN WG1 meeting #59bis, R1-100269, Valencia, Spain, Jan. 18-22, 2010.

CMCC, "Clarification on R-PDCCH", 3GPP TSG-RAN WG1 #61, R1-103232, Montreal, Canada, May 10-14, 2010.

Ericsson et ai, "Enhancements for UE specific control signaling", 3GPP TSG-RAN WG1 #65, Barcelona, Spain, May 9-13, 2011.

Office Action mailed by USPTO dated Jan. 23, 2017 for U.S. Appl. No. 15/289,132.

Notice of Allowance mailed by USPTO dated Jul. 24, 2017 for U.S. Appl. No. 15/289,132.

Notice of Allowance mailed by USPTO dated Jun. 20, 2019 for U.S. Appl. No. 15/814,015.

Final Office Action mailed by USPTO dated Jan. 31, 2019 for U.S. Appl. No. 15/814,015.

Non-Final Office Action mailed by USPTO dated Aug. 16, 2018 for U.S. Appl. No. 15/814,015.

Notice of Allowance mailed by USPTO dated Jul. 7, 2016 for U.S. Appl. No. 14/124,404.

Final Office Action mailed by USPTO dated Oct. 13, 2015 for U.S. Appl. No. 14/124,404.

Non-Final Office Action mailed by USPTO dated Jun. 9, 2015 for U.S. Appl. No. 14/124,404.

Complaint filed Mar. 17, 2021 in the Western District of Texas (Waco Division) for Case No. 6:21-cv-00270.

Amended Complaint filed Apr. 22, 2022 in the Eastern District of Texas for Case No. 2:22-cv-00097.

Non-Final Office Action mailed by USPTO dated Jul. 27, 2020 for U.S. Appl. No. 16/659,680.

Notice of Allowance mailed by USPTO dated Feb. 11, 2021 for U.S. Appl. No. 16/659,680.

Notice of Allowance mailed by USPTO dated Jun. 23, 2021 for U.S. Appl. No. 16/659,680.

U.S. Appl. No. 16/659,680, Bang-Won Seo et al., filed Oct. 22, 2019, U.S. Pat. No. 11,224,036.

U.S. Appl. No. 15/814,015, Bang-Won Seo et al., filed Nov. 15, 2017, U.S. Pat. No. 10,462,776.

U.S. Appl. No. 15/289,132, Bang-Won Seo et al., filed Oct. 8, 2016, U.S. Pat. No. 9,839,026.

U.S. Appl. No. 14/124,404, Bang-Won Seo et al., filed Feb. 20, 2014, U.S. Pat. No. 9,497,749.

* cited by examiner

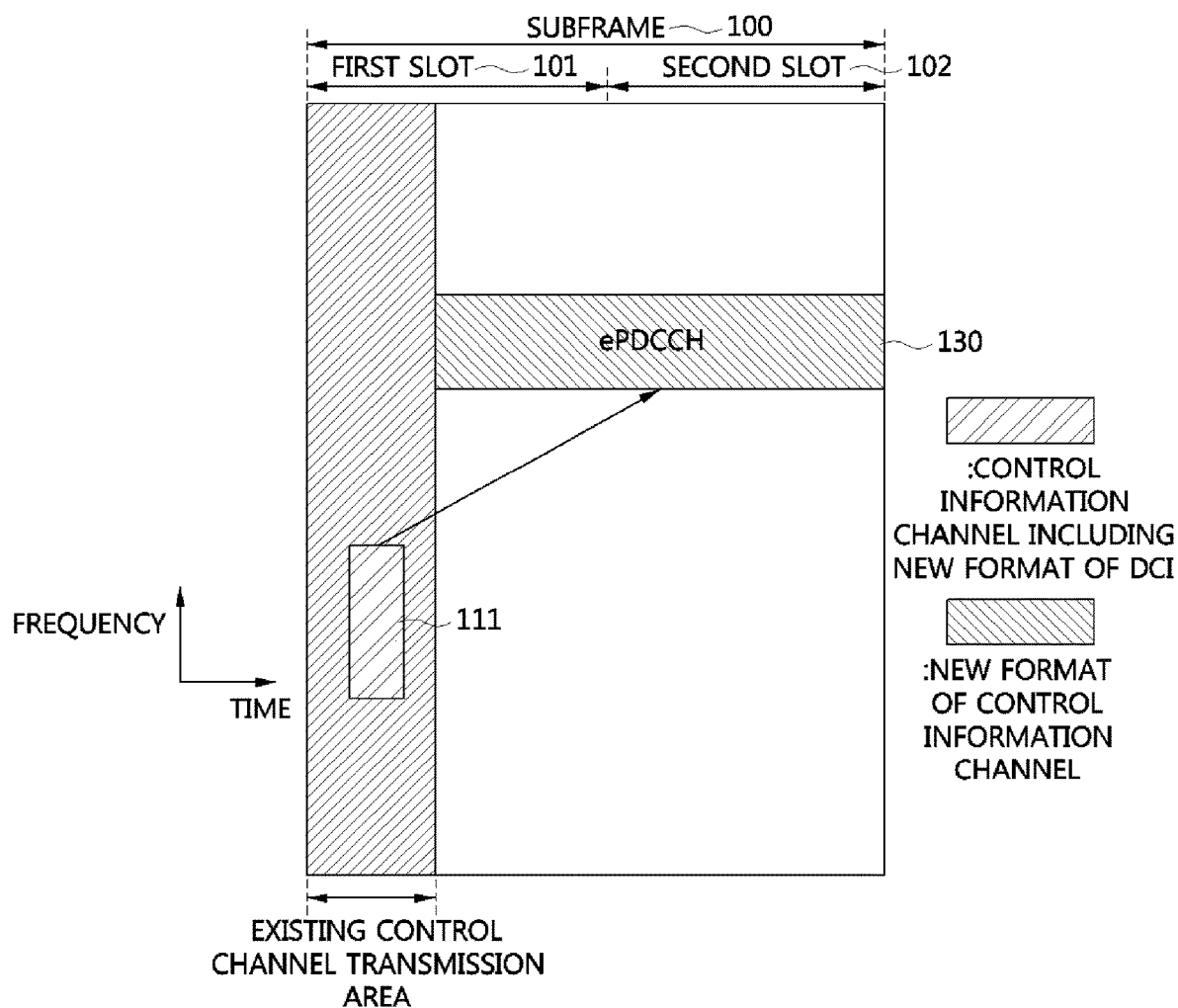

METHOD FOR TRANSMITTING AND RECEIVING CONTROL INFORMATION OF A MOBILE COMMUNICATION SYSTEM

CROSS REFERENCE TO RELATED APPLICATIONS

This application is a continuation of U.S. patent application Ser. No. 16/659,680, filed on Oct. 22, 2019 (now pending), which is a continuation of U.S. patent application Ser. No. 15/814,015, filed on Nov. 15, 2017 (now U.S. Pat. No. 10,462,776), which is a continuation of U.S. patent application Ser. No. 15/289,132, filed on a Oct. 8, 2016 (now U.S. Pat. No. 9,839,026), which is a continuation of U.S. patent application Ser. No. 14/124,404, filed on Feb. 20, 2014 (now U.S. Pat. No. 9,497,749), which is a national entry of International Application No. PCT/KR2012/004496, filed on Jun. 7, 2012, which claims priority of Korean Patent Application No. 10-2011-0071701, filed on Jul. 19, 2011; Korean Patent Application No. 10-2011-0057653, filed on Jun. 14, 2011; and Korean Patent Application No. 10-2011-0054668, filed on Jun. 7, 2011, the entire contents of which are incorporated herein by reference.

TECHNICAL FIELD

The following description relates to a mobile communication system, and more particularly, to a method of transmitting and receiving control information such as uplink or downlink scheduling information, etc. of a mobile communication system.

BACKGROUND ART

A conventional cellular mobile communication system based on 3GPP LTE transmits a downlink control channel by assigning time-frequency resources to an area for transmitting downlink control information. In other words, the conventional cellular mobile communication system uses a method of transmitting control information using one to three OFDM symbols located in the beginning portion of each subframe.

However, due to Multi-user Multiple Input Multiple Output (MU-MIMO) technology in a heterogeneous network environment, control of interference between heterogeneous networks using Carrier Aggregation, frequent use of Multicast-Broadcast Single Frequency Network (MBSFN) subframes, technology of transmitting and receiving Coordinated Multipoint (CoMP), etc., demands for larger capacity of a control channel are increasing.

Accordingly, there is a need for a new control channel design in order to meet the demands for larger capacity of the control channel.

Technical Problem

An example embodiment of the present invention provides a method of transmitting downlink control information, capable of satisfying demands for a larger capacity of control information in a mobile communication system.

Another example embodiment of the present invention provides a method of receiving downlink control information, capable of satisfying demands for a larger capacity of control information in a mobile communication system.

Technical Solution

In an example embodiment, there is provided a method in which a base station transmits downlink control information to a terminal in a mobile communication system where a Physical Downlink Control Channel (PDCCH) area is divided from a Physical Downlink Shared Channel (PDSCH) area, the method including: creating the downlink control information; deciding an enhanced Physical Downlink Control Channel (ePDCCH) resource for transmitting the downlink control information through the PDSCH area; and transmitting the downlink control information to the terminal using the ePDCCH resource.

The ePDCCH may be transmitted through one or both of first and second slots of a subframe.

In the deciding of the ePDCCH resource for transmitting the downlink control information, the ePDCCH resource may be specified using at least one of information about a group of all Physical Resource Blocks (PRBs) through which the ePDCCH is transmitted in the PDSCH area, information about a group of UE-specific PRBs through which the ePDCCH is transmitted, among the group of all PRBs, and information about enhanced Control Channel Elements (eCCEs) belonging to the group of UE-specific PRBs.

In the deciding of the ePDCCH resource for transmitting the downlink control information, at least one of the group of all PRBs and the group of UE-specific PRBs may be specified to be a UE-specific ePDCCH search space of the terminal.

In the deciding of the ePDCCH resource for transmitting the downlink control information, at least one of the group of all PRBs, the group of UE-specific PRBs, and the eCCEs belonging to the group of UE-specific PRBs may be decided using at least one of a unique identifier of the terminal and a number of a slot through which the downlink control channel is transmitted.

In the deciding of the ePDCCH resource for transmitting the downlink control information, at least one of the information about the group of all PRBs, the information about the group of UE-specific PRBs, and the information about the eCCEs belonging to the group of UE-specific PRBs may be transmitted to the terminal using at least one of System Information (SI) broadcasting, Radio Resource Control (RRC) signaling, and a PDCCH.

When the at least one of the information about the group of all PRBs, the information about the group of UE-specific PRBs, and the information about the eCCEs belonging to the group of UE-specific PRBs is transmitted to the terminal using the PDCCH, the PDCCH may be transmitted to a UE-specific PDCCH search space of the terminal.

Uplink control information including ACK/NACK information with respect to a PDSCH scheduled based on the downlink control information and transmitted may be received using a Physical Uplink Control Channel (PUCCH) resource decided by at least ones of numbers assigned to PRBs through which the downlink control information has been transmitted, numbers assigned to eCCEs in the PRBs through which the downlink control information has been transmitted, and numbers of antenna ports that have transmitted the downlink control information.

The PUSCH resource may be decided using a number of an eCCE having the lowest number among eCCEs through which the downlink control information has been transmitted.

In another example embodiment, there is provided a method in which a terminal receives downlink control information from a base station in a mobile communication system where a Physical Downlink Control Channel (PDCCH) area is divided from a Physical Downlink Shared Channel (PDSCH) area, the method including: deciding an enhanced Physical Downlink Control Channel (ePDCCH) resource for receiving the downlink control information through the PDSCH area; and receiving the downlink control information using the ePDCCH resource.

Advantageous Effects

According to the method of transmitting and receiving control information, it is possible to cope with increasing requirements for a larger capacity of control information, thereby improving performance of a mobile communication system.

Also, it is possible to meet the demands for larger capacity of a control channel due to Multi-user Multiple Input Multiple Output (MU-MIMO) technology in a heterogeneous network environment, control of interference between heterogeneous networks using Carrier Aggregation, frequent use of Multicast-Broadcast Single Frequency Network (MBSFN) subframes, technology of transmitting and receiving Coordinated Multipoint (CoMP), etc. In addition, adaptive resource assignment according to a required capacity of control information is possible, which leads to efficient use of resources.

DESCRIPTION OF DRAWINGS

FIG. 6 is a conceptual view explaining a transmission location of a new format of DCI for designating ePDCCH, and the concept of the ePDCCH, according to an example embodiment of the present invention.

Figure 1:
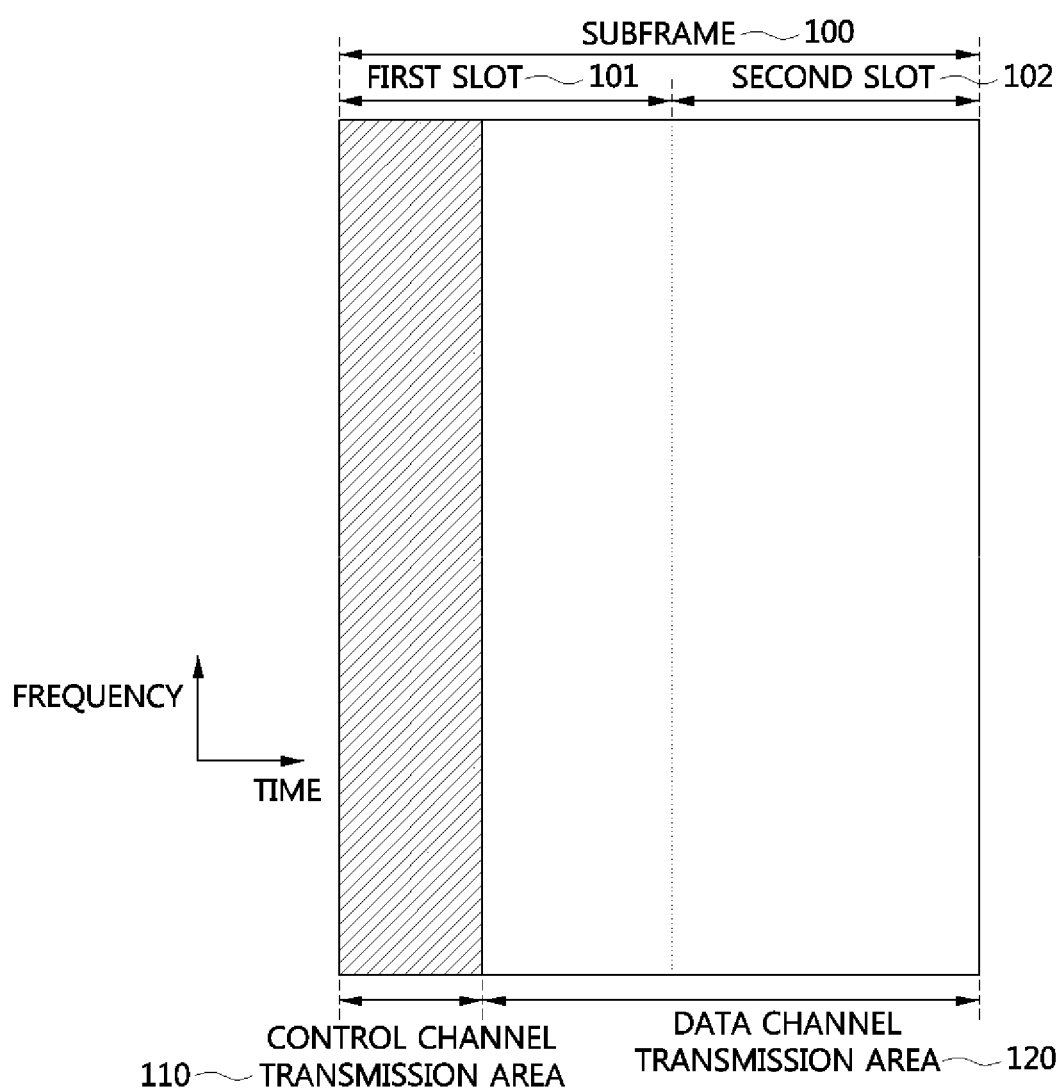
FIG. 1 is a conceptual view explaining the structure of a subframe in which a control channel transmission area is divided from a data channel transmission area.

Throughout the drawings and the detailed description, unless otherwise described, the same drawing reference numerals will be understood to refer to the same elements, features, and structures. The relative size and depiction of these elements may be exaggerated for clarity, illustration, and convenience.

MODE FOR INVENTION

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The term "terminal" used in this specification may be referred to as User Equipment (UE), a User Terminal (UT), a wireless terminal, an Access Terminal (AT), a Subscriber Unit (SU), a Subscriber Station (SS), a wireless device, a wireless communication device, a Wireless Transmit/Receive Unit (WTRU), a mobile node, a mobile, or other words. The terminal may be a cellular phone, a smart phone having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, or also a portable unit or terminal having a combination of such functions. However, the terminal is not limited to the above-mentioned units.

Also, the term "base station" used in this specification means a fixed or movable node that generally communicates with terminals, and may be referred to as another word, such as Node-B, eNode-B, a base transceiver system (BTS), an access point, a relay, a femto-cell, etc.

Hereinafter, embodiments of the present invention will be described in detail with reference to the appended drawings. In the following description, for easy understanding, like numbers refer to like elements throughout the description of the figures, and the same elements will not be described further.

The following description will be, for convenience of description, given using a 3GPP LTE or 3GPP LTE-Advanced system and terms used in 3GPP LTE or 3GPP LTE-Advanced, however, the present invention is not limited to such a 3GPP LTE or 3GPP LTE-Advanced system. That is, the 3GPP LTE or 3GPP LTE-Advanced system is an exemplary system to which the present invention can be applied. For convenience of description, a downlink physical control channel is simply referred to as PDCCH (Physical Downlink Control Channel), and a downlink physical data channel is simply referred to as PDSCH (Physical Downlink Shared Channel).

FIG. 1 is a conceptual view explaining the structure of a subframe 100 in which a PDCCH transmission area 110 is divided from a PDSCH transmission area 120.

FIG. 1 shows the PDCCH transmission area 110 through which downlink control information is transmitted, and the PDSCH transmission area 120 through which data about terminals is transmitted, defined in 3GPP LTE Release 8 and Release 9 or 3GPP LTE-Advanced Release 10.

Referring to FIG. 1, in the subframe 100, the PDCCH transmission area 110 is temporally divided from the PDSCH transmission area 120, and the PDCCH transmission area 110 may be configured with one, two, or three OFDM symbol durations located in the beginning portion of the subframe 100.

However, due to Multi-user Multiple Input Multiple Output (MU-MIMO) technology in a heterogeneous network environment, control of interference between heterogeneous networks using Carrier Aggregation, frequent use of Multicast-Broadcast Single Frequency Network (MBSFN) subframes, technology of transmitting and receiving Coordinated Multipoint (CoMP), etc., demands for larger capacity of a control channel are increasing.

Accordingly, instead of the method of transmitting control information through a control channel transmission area that uses one to three OFDM symbols located in the beginning portion of each subframe, there is a need for a method of transmitting an additional control channel in order to transmit a large amount of control information.

Method of Transmitting and Receiving a Downlink Control Channel, According to an Example Embodiment of the Present Invention According to a method of transmitting a downlink control channel, a base station creates downlink control information that is to be transmitted to a terminal, decides a control channel resource through which the downlink control information will be transmitted, and transmits the downlink control information to the terminal using the control channel resource.

The following description about the method of transmitting the downlink control information to the terminal will be given in view of a base station, however, a method of receiving downlink control information will also be able to be easily understood in view of the terminal based on the following description.

First, a base station creates downlink control information that is to be transmitted to a terminal, wherein the downlink control information includes uplink grant information, uplink scheduling information, downlink resource assignment information, and scheduling information.

Hereinafter, processes of deciding a control channel resource for transmitting the downlink control information and of transmitting the downlink control information to the terminal using the control channel resource will be described.

In order to increase the number of physical channels for transmitting downlink control information or improve performance, the present invention is characterized in transmitting an additional control channel through the PDSCH transmission area 120 which is a data channel transmission area for transmission of PDSCH, defined in 3GPP LTE Release 8 and Release 9 or 3GPP LTE-Advanced Release 10.

Figure 2:
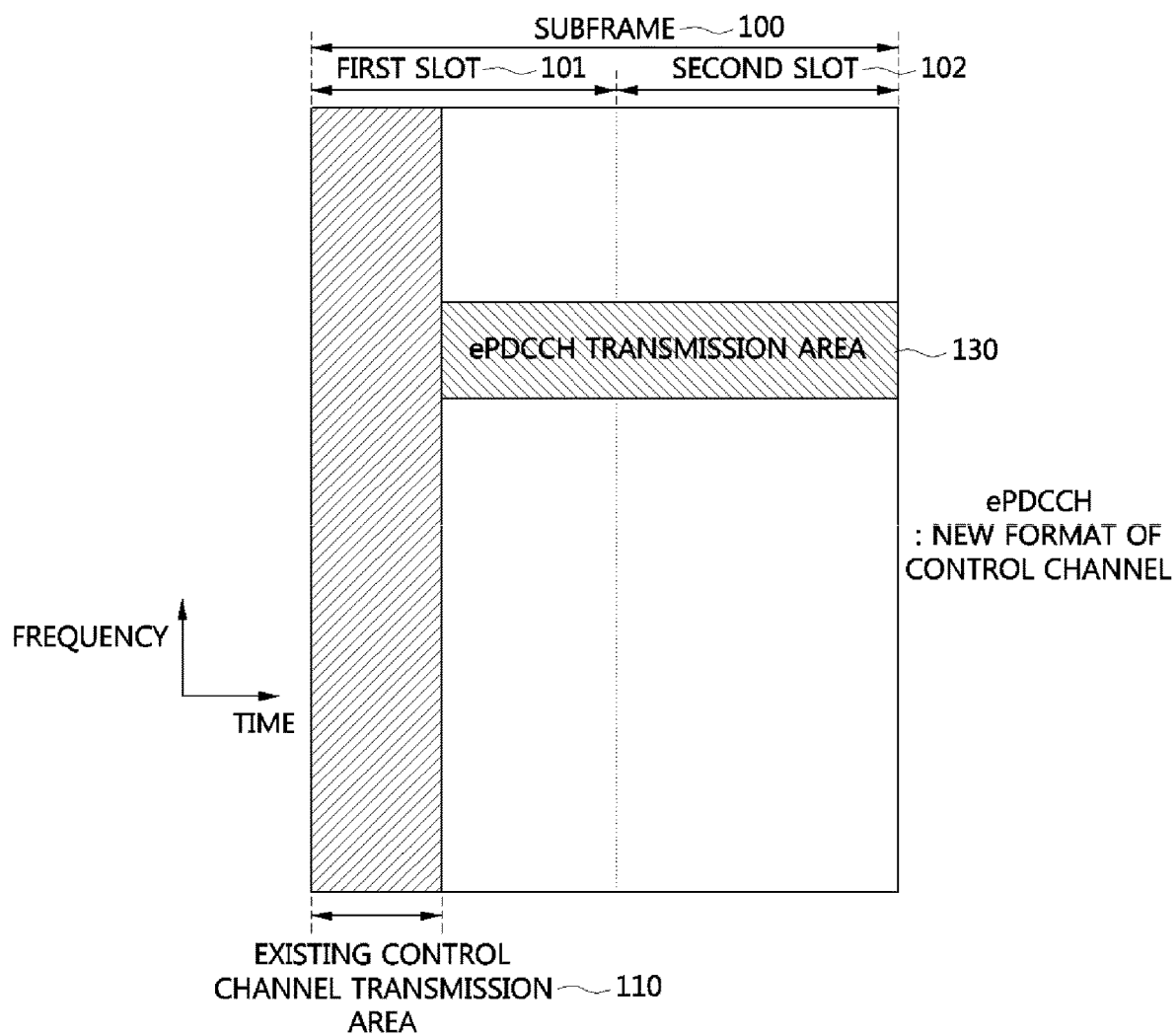
FIG. 2 is a conceptual view explaining a configuration of a downlink control channel, according to an example embodiment of the present invention.

FIG. 2 is a conceptual view explaining a configuration of a downlink control channel, according to an example embodiment of the present invention.

Referring to FIG. 2, in order to distinguish the downlink control channel according to the example embodiment from the conventional physical downlink control channel (PDCCH) 110, the downlink control channel according to the example embodiment will be referred to as ePDCCH (enhanced PDCCH) 130.

If a demodulation reference signal (DM-RS) is included in a physical resource block (PRB) that is transmitted through the ePDCCH 130, a base station may be configured to apply the same precoding as that applied to the DM-RS to the ePDCCH 130. The conventional ePDCCH has been designed to be decoded using a Cell-specific RS (CRS), whereas ePDCCH can be designed to be decoded using a DM-RS included in a PRB.

Downlink control information (DCI) that is transmitted through the ePDCCH 130 may be configured using the same format as DCI defined in 3GPP LTE Release 8 and Release 9 or 3GPP LTE-Advanced Release 10. Also, a format for DCI that is transmitted through the ePDCCH 130 may be newly defined, and the DCI may be transmitted using the newly defined format.

Meanwhile, the ePDCCH 130 may be designed to be transmitted through a single transmission antenna port or a plurality of transmission antenna ports. The numbers of one or more transmission antenna ports through which the ePDCCH 130 is transmitted may be fixed or selected from among the numbers of a plurality of possible transmission antenna ports. At this time, the transmission antenna port numbers may be decided in consideration of information about the locations of time and frequency resources for transmitting the ePDCCH 130, and additional information (terminal identifier such as a Cell Radio Network Temporary Identifier (C-RNTI) or Remote Procedure Call (RPC) signaling information).

If the ePDCCH 130 includes downlink assignment information (for example, scheduling information for PDSCH), the ePDCCH 130 may be mapped to frequency-time resource elements (REs) using first, second, and third methods as follows.

Figure 3:
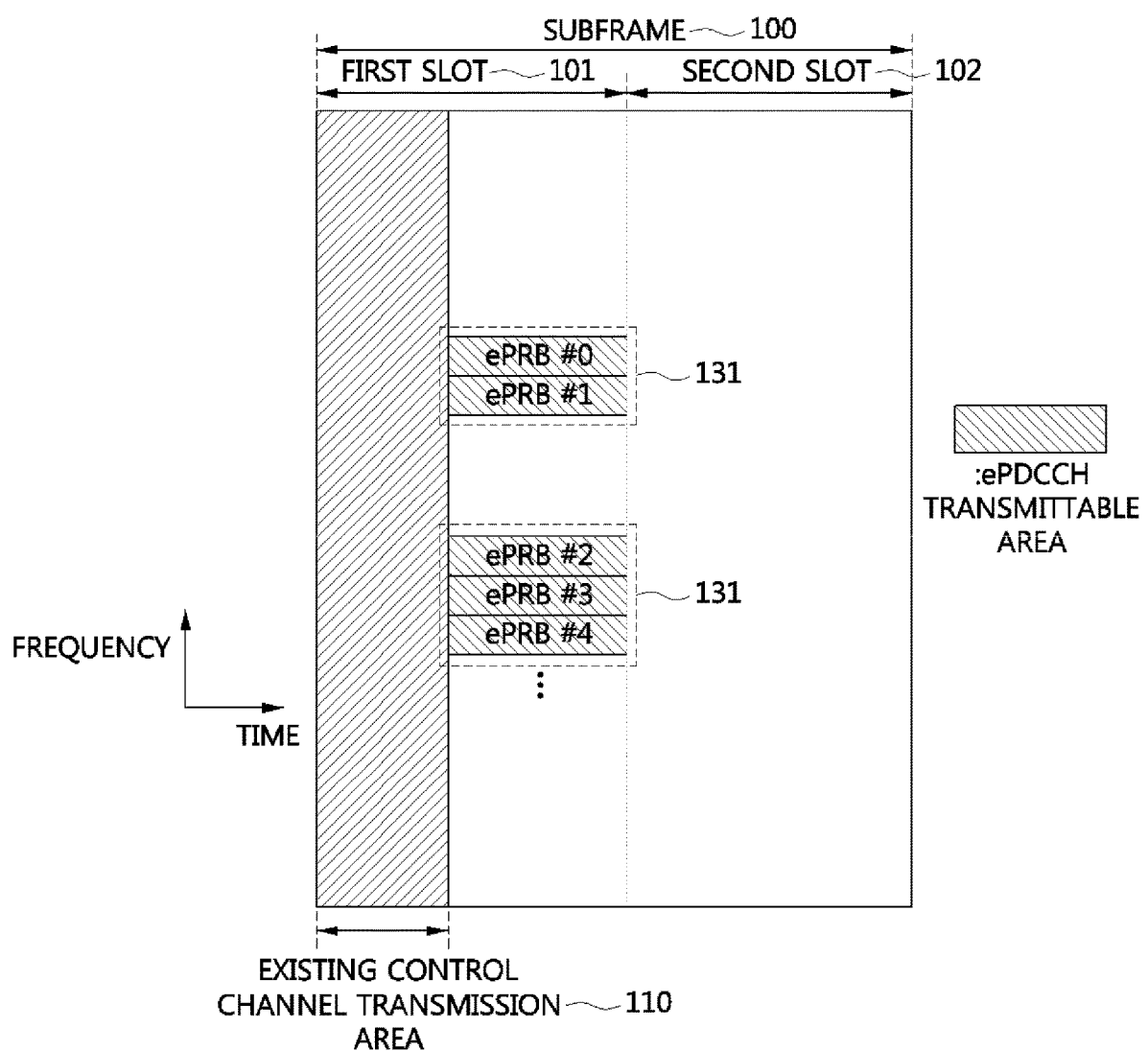
FIGS. 3 through 5 are conceptual views explaining methods of mapping downlink control channel transmission resources in a downlink control channel transmission method according to an example embodiment of the present invention.
Figure 4:
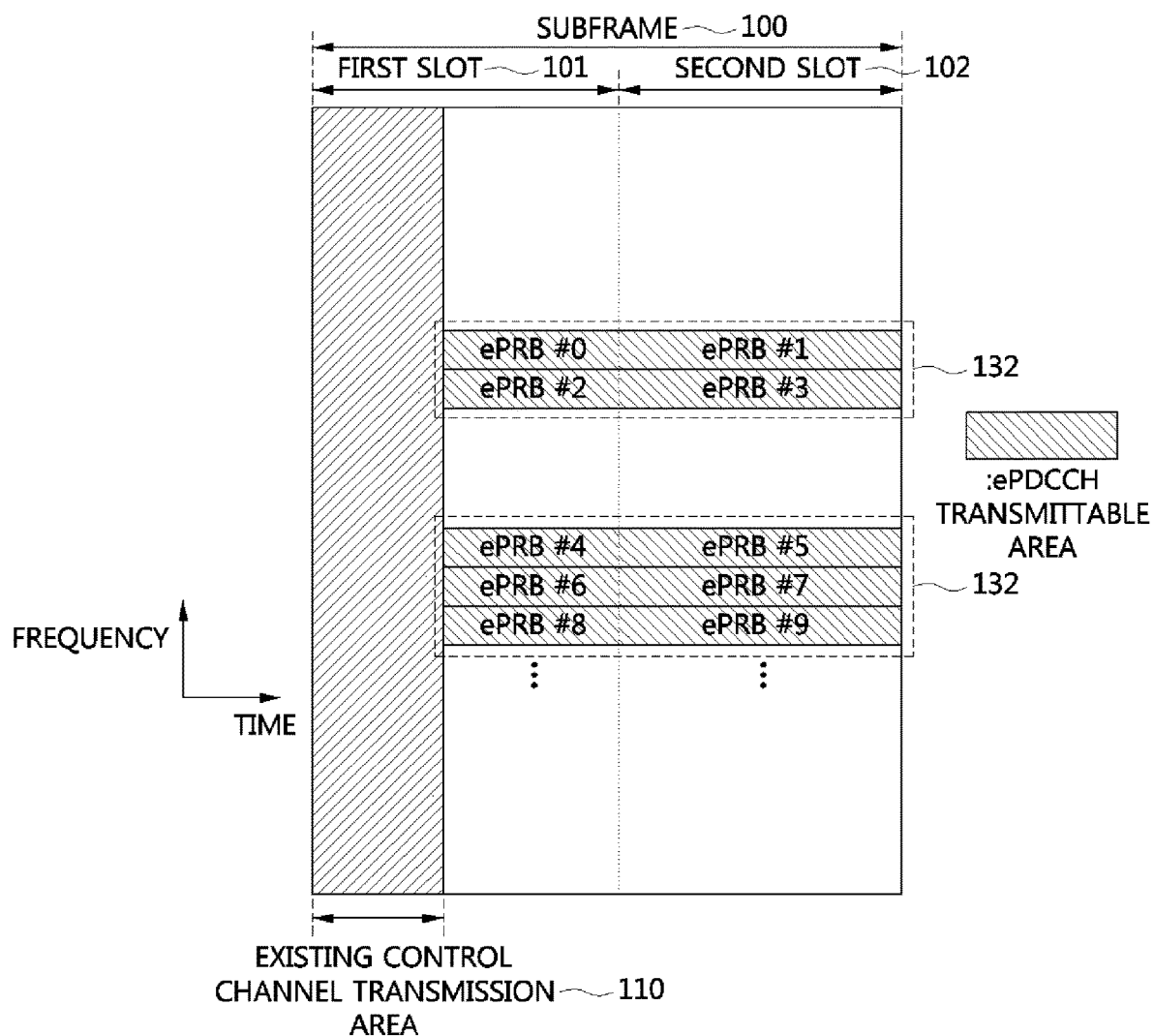
Figure 5:
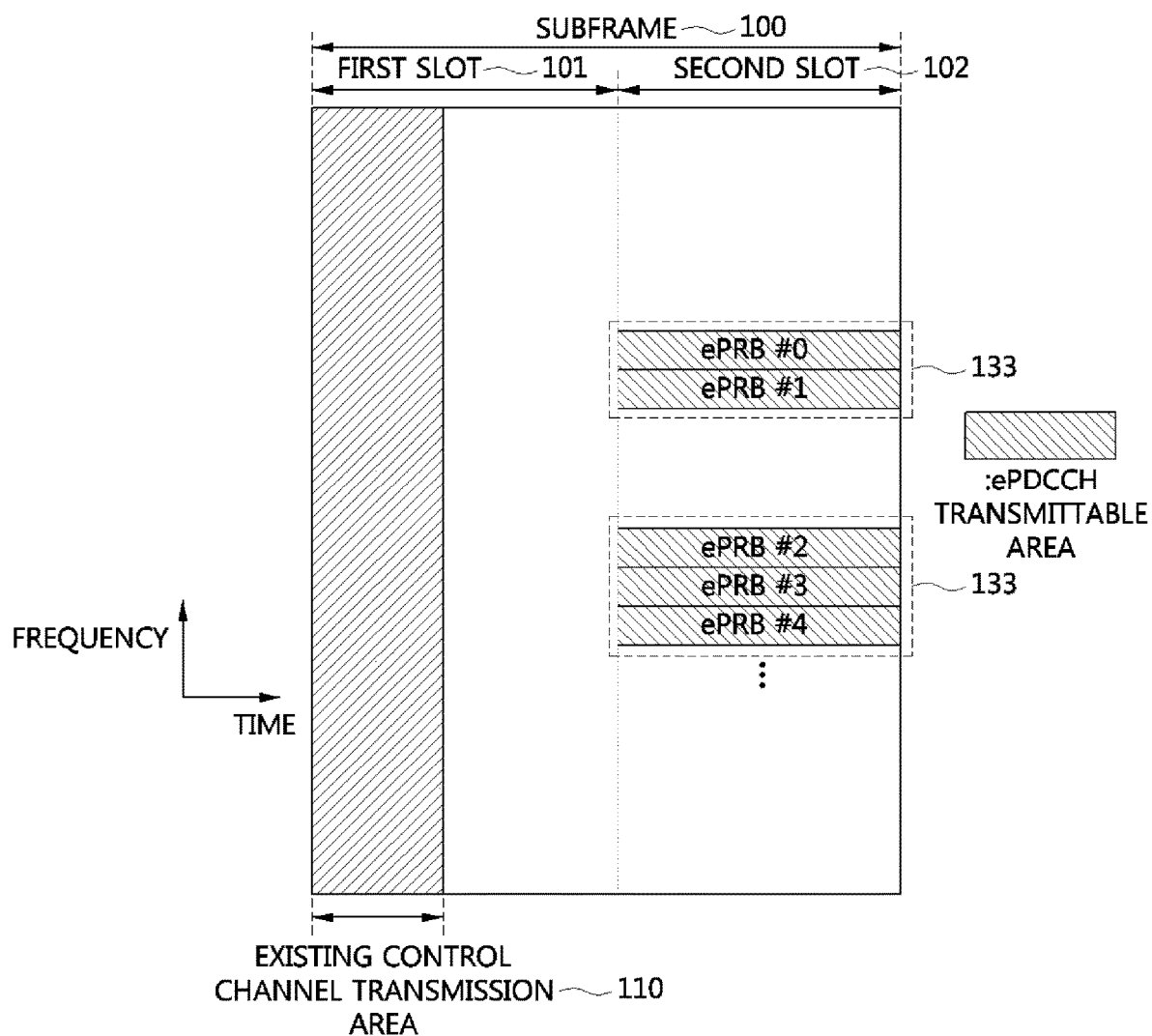

FIGS. 3 through 5 are conceptual views explaining methods of mapping downlink control channel transmission resources in a downlink control channel transmission method according to an example embodiment of the present invention.

In detail, FIG. 3 corresponds to a first method of mapping ePDCCH 131 only to a first slot 101 of each subframe, FIG. 4 corresponds to a second method of mapping ePDCCH 132 to first and second slots 101 and 102 of each subframe, and FIG. 5 corresponds to a third method of mapping ePDCCH 133 only to a second slot 102 of each subframe.

According to the first method, if the ePDCCH 131 is mapped only to the first slot of each subframe, PDSCH may be mapped to the second slot at a frequency to which the ePDCCH 131 is mapped. Meanwhile, according to the third method, if the ePDCCH 133 is mapped to the second slot of each subframe, PDSCH may be mapped to the first slot at a frequency to which the ePDCCH 133 is mapped.

If ePDCCH includes uplink grant or uplink assignment information (for example, scheduling information for PUSCH), the ePDCCH may be mapped to frequency-time REs using one of the first through third methods described above.

Meanwhile, the first method may be adopted when ePDCCH includes downlink assignment information or PDSCH scheduling information, and the third method may be adopted when ePDCCH includes uplink grant or uplink assignment information. On the contrary, the third method may be adopted when ePDCCH includes downlink assignment information or PDSCH scheduling information, and the first method may be adopted when ePDCCH includes uplink grant or uplink assignment information.

Also, ePDCCH may be designed such that each PRB transmits a part or all of ePDCCH for a terminal, or such that each PRB transmits a part or all of ePDCCH for a plurality of terminals.

A method of designing ePDCCH such that each PRB transmits a part or all of ePDCCH for a terminal will be referred to as a "method of transmitting ePDCCH for a terminal through a PRB", and a method of designing ePDCCH such that each PRB transmits a part or all of ePDCCH for a plurality of terminals will be referred to as a "method of transmitting ePDCCH for two or more terminals through a PRB".

In both the "method of transmitting ePDCCH for a terminal through a PRB" and the "method of transmitting ePDCCH for two or more terminals through a PRB", information about a group of PRBs (hereinafter, each referred to as "ePRB (enhanced Physical Resource Block)") that can be used to transmit ePDCCH may be included in a rule defined in advance between a base station and terminals. Or, the information about the group of ePRBs needs to be shared between the base station and the terminals by a method (that is, signaling) in which the base station informs the terminals of the information.

Referring again to FIGS. 3, 4, and 5, a group of all PRBs that a base station can use to transmit ePDCCH to all terminals belonging to a cell will be referred to as a "group of all ePDCCH transmittable ePRBs". Also, an arbitrary PRB belonging to the "group of all ePDCCH transmittable ePRBs" will be referred to as an ePRB.

Information about such a "group of all ePDCCH transmittable ePRBs" may be informed to the terminals by the base station through upper layer signaling. The upper layer signaling may be Radio Resource Control (RRC) signaling. Or, information about the "group of all ePDCCH transmittable ePRBs" may be transmitted as System Information (SI) to the terminals by the base station through broadcasting. Or, a new DCI format is designed, information about the "group of all ePDCCH transmittable ePRBs" is included in the DCI format, and then, the resultant DCI format is transmitted through PDCCH. This signaling method will be described later.

1) Method of Transmitting ePDCCH for Two or More Terminals Through a PRB

In this case, ePDCCH for each terminal may be mapped to REs in unit of an enhanced Control Channel Element (eCCE). Each eCCE corresponds to L time-frequency REs, and the L time-frequency REs belong to a "group of all ePDCCH transmittable ePRBs"

The L value may be a value near 36. eCCE is different from CCE in that CCE consists of resource elements existing in an area capable of transmitting PDCCH in an existing system, and eCCE consists of resource elements existing in an area capable of transmitting ePDCCH. In the case where ePDCCH for an arbitrary terminal is actually transmitted, control information about the terminal may be mapped to one, two, four, or eight eCCEs.

If the number of all eCCEs existing in resource areas (that is, resource areas in PRBs that can be used to transmit ePDCCH) capable of transmitting ePDCCH in a k-th subframe is $N_{eCCE,K}$, the eCCEs may be assigned from a number 0 to a number $N_{eCCE,K}-1$.

In this case, the locations of eCCEs to which ePDCCH for each terminal can be mapped, among all the eCCEs existing in the resource areas capable of transmitting ePDCCH, may be decided by implicit methods or explicit methods.

According to an example of the implicit methods, the locations of eCCEs to which ePDCCH for each terminal can be mapped may be decided according to the RNTI value of the terminal or according to the RNTI value of the terminal and a slot number. Here, RNTI may be C-RNTI, Semi-Persistent Scheduling C-RNTI (SPS C-RNTI), System Information-RNTI (SI-RNTI), Paging-RNTI (P-RNTI), or Random Access-RNTI (RA-RNTI).

Also, according to an example of the explicit methods, the locations of eCCEs to which ePDCCH for each terminal may be designated by RPC signaling or a newly defined DCI which will be described later. According to another example of the explicit methods, a rule capable of deciding eCCE locations is selected by RPC signaling or a newly defined DCI so as to enable each terminal to decide eCCE locations according to the selected rule.

The locations of eCCEs to which ePDCCH for each terminal can be mapped may vary depending on a slot number. For example, ePDCCH for an arbitrary terminal may be mapped to eCCEs starting from a third eCCE at a slot number 1, and at a slot number 2, the ePDCCH for the terminal may be mapped to eCCEs starting from an eighth eCCE.

Accordingly, in the method of transmitting ePDCCH for two or more terminals through a PRB, information about REs through which ePDCCH is transmitted can be recognized based on information about the "group of all ePDCCH transmittable ePRBs" and information about eCCEs.

If the "group of all ePDCCH transmittable ePRBs" dynamically changes, information about a "group of all ePDCCH transmittable ePRBs" implicitly or explicitly signaled and information about eCCEs may be used to recognize information about REs through which ePDCCH is transmitted. If the "group of all ePDCCH transmittable ePRBs" is decided according to a rule set in advance between a base station and terminals, only information about eCCEs may be used to recognize information about REs through which ePDCCH is transmitted.

2) Method of Transmitting ePDCCH for a Terminal Through a PRB

First, if ePDCCH includes downlink assignment information or scheduling information for PDSCH, the ePDCCH may be transmitted using such resource mapping methods as the first, second, and third methods described above.

Likewise, if ePDCCH includes uplink grant information or uplink scheduling information, the ePDCCH may be transmitted using such resource mapping methods as the first, second and third methods described above.

As described above, the first method may be adopted when ePDCCH includes downlink assignment information or scheduling information for PDSCH, and the third method may be adopted when ePDCCH includes uplink grant or uplink assignment information. On the contrary, the third method may be adopted when ePDCCH includes downlink assignment information, and the first method may be adopted when ePDCCH includes uplink grant or downlink assignment information.

Meanwhile, unlike the method of transmitting ePDCCH for two or more terminals through a PRB, in the method of transmitting ePDCCH for a terminal through a PRB, instead of designating a location at which ePDCCH will be transmitted in units of eCCE, a location at which ePDCCH will be transmitted has to be designated in unit of PRB for each terminal.

Accordingly, in addition to the "group of all ePDCCH transmittable ePRBs", that is, information about all PRBs that a base station can use to transmit ePDCCH to all terminals belonging to a cell, it is necessary to define ePRB resources to which ePDCCH for an arbitrary user can be mapped, among the "group of all ePDCCH transmittable ePRBs", as a "group of UE-specific ePDCCH transmittable ePRBs".

That is, a base station may transmit ePDCCH for an arbitrary terminal using some ePRBs of a "group of UE-specific ePDCCH transmittable ePRBs" of the terminal or using all PRBs configuring the "group of UE-specific ePDCCH transmittable ePRBs" of the terminal.

Information about the "group of all ePDCCH transmittable ePRBs" or the "group of UE-specific ePDCCH transmittable ePRBs" may be informed to the terminals by the base station through upper layer signaling.

Here, the upper layer signaling may be RRC signaling which will be described later.

Or, by designing a DCI format and including information about the "group of all ePDCCH transmittable ePRBs" or the "group of UE-specific ePDCCH transmittable ePRBs" in the DCI format, the information about the "group of all ePDCCH transmittable ePRBs" or the "group of UE-specific ePDCCH transmittable ePRBs" may be informed to the terminals, which will be described later.

In order for a terminal to determine whether its own ePDCCH exists in each subframe, the terminal searches for its own ePDCCH only in the "group of UE-specific ePDCCH transmittable ePRBs" for itself. Accordingly, the "group of UE-specific ePDCCH transmittable ePRBs" is, in view of a terminal, a search space in which the terminal has to search to find its own ePDCCH. This process will be described later in a PDCCH and ePDCCH search method of a terminal.

Meanwhile, ePRBs configuring the "group of all ePDCCH transmittable ePRBs" or the "group of UE-specific ePDCCH transmittable ePRBs" may be continuous or discontinuous PRBs on frequency axis.

Also, like the second method of transmitting ePDCCH for a terminal through an ePRB, if both the first and second slots of each subframe can transmit ePDCCH, there are various methods of assigning numbers to ePRBs.

One of methods of assigning numbers to ePRBs will be described with reference to FIG. 4. Referring to FIG. 4, ePRBs having lower frequencies are first assigned ePRB numbers, and at the same frequency, an ePRB corresponding to a smaller slot number is first assigned an ePRB number.

ePDCCH for a terminal to which the ePDCCH is actually transmitted may be sequentially mapped to ePRBs. For example, as illustrated in FIG. 3, if a base station actually transmits ePDCCH to an arbitrary terminal, the start location of a resource to which the ePDCCH is mapped is ePRB #1, and the ePDCCH mapped to three ePRBs, ePDCCH for the terminal is sequentially mapped to ePRBs #1, #2, and #3.

Method of a Base Station Signaling Transmission Information of ePDCCH for a Terminal As described above, in order for a terminal to receive downlink control information, etc. through ePDCCH, a base station has to inform the terminal of information about ePDCCH in advance. The base station may inform the terminal of information about ePDCCH using one of the methods as follows:

(Method A) Method of Informing Scheduling Information of ePDCCH Through RRC Signaling.

A base station may be configured to inform a terminal of scheduling information of ePDCCH through RRC signaling. Here, the scheduling information of ePDCCH may include information about time and/or frequency resources through which ePDCCH (that is, eCCE resources to which control information is mapped) is transmitted. In this case, since the base station uses RRC signaling to directly inform the terminal of locations of resources through which ePDCCH is transmitted, the terminal can acquire downlink control information from resources at locations indicated by RRC signaling, without having to search for ePDCCH areas.

As a method of modulating control information that is transmitted through ePDCCH, a BPSK or QPSK method may be used for robust transmission, or through RRC signaling, modulation and coding scheme (MCS) information may be informed. In addition, scheduling information may include rank information for the ePDCCH. Also, scheduling information may include information about a transmission antenna port for the ePDCCH.

If PDSCH and ePDCCH are simultaneously transmitted using the same time-frequency resources through different antenna ports (that is, different antenna layers), RRC signaling may be used to inform the terminal of the simultaneous transmission of the PDSCH, or of rank information for the PDSCH or information about the transmission antenna ports.

(Method B) Method of Informing Scheduling Information of ePDCCH Through New Downlink Control Information Another method in which a base station informs a terminal of scheduling information of ePDCCH is to use downlink control information having a new format (that is, a new DCI format for representing scheduling information of ePDCCH, which is different from existing DCI formats, is defined). A control channel for transmitting the new DCI format may exist in a PDCCH transmission area defined in 3GPP LTE Release 8 and Release 9 or LTE-Advanced Release 10.

FIG. 6 is a conceptual view explaining ePDCCH 130 and a new format of DCI 111 for designating the ePDCCH 130, according to an example embodiment of the present invention.

Referring to FIG. 6, a control channel for transmitting the new format of DCI 111 may exist in one, two or three OFDM symbol areas, starting from the beginning portion of each subframe.

The new format of DCI 111 includes scheduling information of the ePDCCH 130. The scheduling information of the ePDCCH 130 includes information about time and/or frequency resources through which the ePDCCH 130 is transmitted. Also, the scheduling information may include MCS information for the ePDCCH 130.

Also, scheduling information may include rank information for the ePDCCH 130 or information about transmission antenna ports transmitting the ePDCCH 130. If PDSCH and the ePDCCH 130 are simultaneously transmitted using the same time and frequency resources, the scheduling information may include information indicating that PDSCH is transmitted together with the ePDCCH 130, or the scheduling information may inform of rank information for the PDSCH or information about transmission antenna ports transmitting the PDSCH.

At this time, the control channel (PDSCCH) for transmitting the new format of DCI 111 may exist in a UE-specific search space among areas in which a terminal has to search to find PDCCH transmitted to itself.

(Method C) Method of Informing Information about ePDCCH Transmittable Areas Through RRC Signaling.

According to method C, a base station directly informs a terminal of information about both a "group of all ePDCCH transmittable ePRBs" and a "group of UE-specific ePDCCH transmittable ePRBs" through RRC signaling, or explicitly informs the terminal of information about one of the "group of all ePDCCH transmittable ePRBs" and the "group of UE-specific ePDCCH transmittable ePRBs" through RRC signaling.

Method C performs signaling using one of the methods as follows:

According to one of the methods, a base station informs each terminal of information about a "group of all ePDCCH transmittable ePRBs", and the terminal searches for a "group of UE-specific ePDCCH transmittable ePRBs" for itself in the "group of all ePDCCH transmittable ePRBs" using its own RNTI value or using its own RNTI value and a slot number.

Also, the frequencies of the ePRBs configuring the "group of all ePDCCH transmittable ePRBs" may not change with respect to each subframe until a new signal is received. In other words, the "group of all ePDCCH transmittable ePRBs" is maintained as the most recently received information until a new signal is received.

In order for the terminal to determine whether ePDCCH for itself exists in each subframe, the terminal searches for the ePDCCH only in the "group of UE-specific ePDCCH transmittable ePRBs". Accordingly, in view of the terminal, the "group of ePDCCH transmittable ePRBs" becomes an ePDCCH search space for the terminal.

According to another one of the methods, a base station directly informs each terminal of a "group of UE-specific ePDCCH transmittable ePRBs" using UE-specific parameters. In this case, the terminal can acquire the "group of UE-specific ePDCCH transmittable ePRBs" for itself through signaling received from the base station, and determines whether ePDCCH for itself has been actually transmitted in the "group of UE-specific ePDCCH transmittable ePRBs".

The base station may inform a plurality of terminals of different "groups of UE-specific ePDCCH transmittable ePRBs", respectively, or may group a plurality of terminals into several groups and inform each group of the same "group of UE-specific ePDCCH transmittable ePRBs". Also, the frequencies of the ePRBs configuring the "group of UE-specific ePDCCH transmittable ePRBs" may not change with respect to each subframe until a new signal is received. In other words, the "group of UE-specific ePDCCH transmittable ePRBs" for the corresponding terminal is maintained as the most recently received information until a new signal is received.

Also, signaling information may include MCS information about control information that is transmitted through the ePDCCH. The signaling information may include rank information for the ePDCCH or information about transmission antenna ports.

PDCCH and ePDCCH Search Method of a Terminal

According to 3GPP LTE Release 8 and Release 9 or LTE-Advanced Release 10, each terminal searches for a "common search space" and a "UE-specific search space" in order to find PDCCH transmitted to itself, wherein the "common search space" is a space which all terminals search in common, and the "UE-specific search space" is a space which only the specific terminal can search. According to the method of transmitting and receiving DCI, as described above, ePDCCH transmission areas decided by signaling of a base station or by an implicit method can be understood to be included in the "UE-specific search space".

Also, as described above, DCI that is transmitted through ePDCCH may be configured using the same format as DCI defined in 3GPP LTE Release 8 and Release 9 or LTE-Advanced Release 10. Alternatively, it is also possible to define a new format for DCI that is transmitted through ePDCCH, and transmit the DCI using the newly defined format, wherein the newly defined DCI format is distinguished from the newly defined DCI format for signaling ePDCCH areas as described above with reference to FIG. 6.

Hereinafter, a method in which a terminal searches for a newly defined format of DCI for indicating an ePDCCH transmission area, and a method in which the terminal searches for DCI transmitted through an ePDCCH transmission area in the ePDCCH transmission area will be described.

First, the method in which the terminal searches for the newly defined format of DCI will be described below.

The method in which the terminal searches for the newly defined format of DCI (that is, DCI for indicating an ePDCCH transmission area), as illustrated in FIG. 6, may be one of the methods as follows:

(Method A) Method of enabling a terminal to search for an existing DCI format in a UE-specific search space. That is, method A prevents a new format of DCI from being transmitted through an existing PDCCH area. Accordingly, method A is used in the case of using no ePDCCH or in the case of signaling existence of ePDCCH using a different method (for example, RRC signaling) from the method of using a new format of DCI.

(Method B) Method of enabling a terminal to search for a new format of DCI in a UE-specific search space. That is, method B is to transmit a new format of DCI through a UE-specific search space of an existing PDCCH area, while transmitting no new format of DCI through a common search space.

(Method C) Method of enabling a terminal to search for both an existing format of DCI and a new format of DCI in a UE-specific search space. That is, method C is configured to transmit all the existing format of DCI and the new format of DCI through a UE-specific search space.

In methods A, B, and C, a base station may inform the terminal that the terminal has to search for an existing format of DCI in the UE-specific search space, or that the terminal has to search for a new format of DCI in the UE-specific search space, through signaling. The signaling may be RRC signaling.

Then, a method in which a terminal searches for an ePDCCH area will be described below.

The terminal searches for a common search space in an existing PDCCH area in order to check whether there is a control channel transmitted to itself, and also, the terminal searches for an ePDCCH search space area recognized through RRC signaling. That is, an ePDCCE transmission area decided by signaling of a base station or by an implicit method can be understood to be included in a "UE-specific search space".

As described above, a method in which the base station informs the terminal of the ePDCCH search space may be signaled using one of the methods as follows.

According to one of the methods, a base station informs each terminal of a "group of all ePDCCH transmittable ePRBs", and the terminal searches for a "group of UE-specific ePDCCH transmittable ePRBs" for itself in the "group of all ePDCCH transmittable ePRBs", using its own RNTI value or using its own RNTI value and a slot number. The terminal searches for ePDCCH only in the "group of UE-specific PDCCH transmittable ePRBs" in order to check whether ePDCCH for itself exists in each subframe. Accordingly, in view of the terminal, the "group of UE-specific ePDCCH transmittable ePRBs" becomes an ePDCCH search space for the terminal.

According to another one of the methods, a base station informs each terminal of a "group of UE-specific ePDCCH transmittable ePRBs" using a UE-specific parameter. The terminal searches for ePDCCH in the "group of UE-specific ePDCCH transmittable ePRBs" for itself.

Method of Designing ePDCCH when there are a Plurality of Transmission and Reception Points An environment where a plurality of transmission/reception points are geographically distant from each other in the same cell and each transmission/reception point has one or more transmission/reception antennas is considered. Specifically, an environment which a plurality of transmission points belongs to the same cell and have the same cell ID is considered. The transmission/reception points may be referred to as Remote Radio Heads (RRHs) or Remote Radio Units (RRUs). The RRHs are connected to a base station through optical fiber or microwave, etc. so as to receive/transmit information from/to the base station.

In the environment, a method of creating ePDCCH will be described below. Bit-level scrambling may be used to create ePDCCH. At this time, in order to reuse ePDCCH resources between transmission points, virtual cell IDs may be used. That is, transmission points belonging to the same cell and having the same cell ID may be assigned different virtual cell IDs. Accordingly, a method of creating a scrambling sequence for bit-level scrambling on ePDCCH is to create a scrambling sequence using the virtual cell IDs of transmission points of transmitting ePDCCH, instead of using a cell ID. Another method of creating a scrambling sequence for bit-level scrambling on ePDCCH is to create a scrambling sequence using a cell ID.

In order to create PDCCH for transmitting a new format of DCI, bit-level scrambling may also be used. At this time, one method of creating a scrambling sequence for bit-level scrambling on the PDCCH is to create the scrambling sequence using a cell ID. Another method of creating a scrambling sequence for bit-level scrambling on the PDCCH is to create a scrambling sequence using the virtual cell ID of a transmission point of transmitting PDCCH, instead of using the cell ID.

Method of Designing a Physical Uplink Control Channel (PUCCH)

In order to transmit ACK/NACK information with respect to PDSCH scheduled by ePDCCH described above to PUCCH, it is necessary to set a relationship between the PDSCH scheduled by the ePDCCH and the PUCCH to which the ACK/NACK information with respect to the PDSCH is transmitted.

Hereinafter, a method of transmitting ACK/NACK (or, ACK/NAK) information with respect to PDSCH scheduled by ePDCCH to PUCCH will be described.

Specifically, a PUCCH transmission method when ePDCCH is transmitted through one antenna port and thus PDSCH scheduled by the ePDCCH is also transmitted through one antenna port will be first described, below.

1) Method of Transmitting ACK/NACK Information with Respect to PDSCH Scheduled by ePDCCH that is Transmitted by the Method of Transmitting ePDCCH for Two or More Terminals Through a PRB.

As described above, in the method of transmitting ePDCCH for two or more terminals through a PRB, a part or all of ePDCCH for a plurality of terminals may be interleaved in each ePRB and transmitted. At this time, control information of each terminal, which is transmitted to ePDCCH, is mapped to time-frequency resources in units of eCCE.

First, in order to transmit ACK/NACK information with respect to PDSCH scheduled by ePDCCH, a case of transmitting PUCCH using a transmission antenna port will be described.

If a transmission antenna port that is used for transmitting PUCCH is $p_0$, a PUCCH resource $n_{PUCCH}^{(1,p=p0)}$ for the transmission antenna port $p_0$ may be configured according to Equation 1, below:

$$n_{PUCCH}^{(1,p=p0)} = n_{eCCE}^{(ePDCCH)} + N_{PUCCH}^{(e,1)}, \quad (1)$$

where $n_{eCCE}^{(ePDCCH)}$ represents the lowest eCCE index among eCCEs configuring ePDCCH including scheduling information of the PDSCH, and $N_{PUCCH}^{(e,1)}$ represents a parameter configured by the upper layer and may be provided by RRC.

That is, Equation 1 means that ACK/NACK information with respect to PDSCH scheduled by ePDCCH transmitted using eCCEs starting from $n_{eCCE}^{(ePDCCH)}$ is transmitted using a PUCCH resource $n_{PUCCH}^{(1,p=p0)}$.

Next, a case of using two transmission antenna ports in order to transmit ACK/NACK information with respect to PDSCH scheduled by ePDCCH will be described. That is, the case may correspond to the case of transmitting the same ACK/NACK information using two transmission antenna ports.

In this case, PUCCH resources $n_{PUCCH}^{(1,p=p0)}$ and $n_{PUCCH}^{(1,p=p1)}$ for two transmission antenna ports $p_0$ and $p_1$ may be configured as follows. In regard of the transmission antenna port $p_0$, the same method used in the case where a transmission antenna port is used, as described above, may be used. That is, the PUCCH resource $n_{PUCCH}^{(1,p=p0)}$ can be configured according to Equation 2, below:

$$n_{PUCCH}^{(1,p=p0)} = n_{eCCE}^{(ePDCCH)} + N_{PUCCH}^{(e,1)} \quad (2)$$

In regard of the other transmission antenna port $p_1$, the PUCCH resource $n_{PUCCH}^{(1,p=p1)}$ can be configured according to Equation 3, below:

$$n_{PUCCH}^{(1,p=p1)} = n_{eCCE}^{(ePDCCH)} + M_1 + N_{PUCCH}^{(e,1)}, \quad (3)$$

where $M_1$ is a constant, and for example, $M_1=1$.

Now, a method of setting $N_{PUCCH}^{(e,1)}$ will be described. The $N_{PUCCH}^{(e,1)}$ may be set by the upper layer, according to one of methods as follows:

(Method A) Method of Setting the Same $N_{PUCCH}^{(e,1)}$ for all Terminals

Method A is to set the same $N_{PUCCH}^{(e,1)}$ for all terminals. That is, method A is to configure the $N_{PUCCH}^{(e,1)}$ using a cell-specific parameter for all terminals. For this, a cell-specific parameter that is applied in common to all terminals, among RRC parameters, may be used to inform the terminals. Another method of configuring the same $N_{PUCCH}^{(e,1)}$ for all terminals is to set UE-specific parameters for all terminals to the same value.

(Method B) Method of Configuring the $N_{PUCCH}^{(e,1)}$ Using UE-Specific Parameters.

Method B is to inform terminals of the $N_{PUCCH}^{(e,1)}$ using UE-specific parameters. That is, the $N_{PUCCH}^{(e,1)}$ is informed to terminals using UE-specific parameters among RRC parameters. Method B includes a method of grouping terminals into several groups and setting the same value for each group.

2) Method of Transmitting ACK/NACK Information with Respect to PDSCH Scheduled by ePDCCH Transmitted by the Method of Transmitting ePDCCH for a Terminal Through a PRB.

As described above, in the method of transmitting ePDCCH for a terminal through a PRB, a part or all of ePDCCH for a terminal can be transmitted through each ePRB. At this time, control information of each terminal, which is transmitted to the ePDCCH, is mapped to time-frequency resources in units of ePRB. That is, ePDCCH for each terminal may be configured in units of ePRB.

A case of using a transmission antenna port in order to transmit ACK/NACK information with respect to PDSCH scheduled by ePDCCH to PUCCH will be first described below. The transmission antenna port is given as p0.

A PUCCH resource $n_{PUCCH}^{(1,\tilde{p}=p_0)}$ for the transmission antenna port $p_0$ can be configured according to Equation 4, below:

$$n_{PUCCH}^{(1,\tilde{p}=p_0)} = n_{ePRB}^{(ePDCCH)} + N_{PUCCH}^{(e,2)}, \qquad (4)$$

where $n_{eCCE}^{(ePDCCH)}$ represents the lowest eCCE index among eCCEs configuring ePDCCH of the corresponding terminal. For example, if ePDCCH is mapped to ePRBs #2, #3, and #4 in the method illustrated in FIG. 3, 4, or 5, $n_{eCCE}^{(ePDCCH)}$ is 2.

A case of using two transmission antenna ports p0 and p1 in order to transmit ACK/NACK information with respect to ePDSCH scheduled by the PDCCH to PUCCH will be described below.

A PUCCH resource $n_{PUCCH}^{(1,\tilde{p}=p_0)}$ for the transmission antenna port $p_0$ may be configured in the same method as used in the case where a transmission antenna port is used. That is, the PUCCH resource $n_{PUCCH}^{(1,\tilde{p}=p_0)}$ can be configured according to Equation 5, below:

$$n_{PUCCH}^{(1,\tilde{p}=p_0)} = n_{ePRB}^{(ePDCCH)} + N_{PUCCH}^{(e,2)} \qquad (5)$$

A PUCCH resource $n_{PUCCH}^{(1,\tilde{p}=p_1)}$ for the other transmission antenna port p1 can be configured according to Equation 6, below:

$$n_{PUCCH}^{(1,\tilde{p}=p_1)} = n_{ePRB}^{(ePDCCH)} + M_2 + N_{PUCCH}^{(e,2)}, \qquad (6)$$

where $M_2$ is a constant, and for example, $M_2=1$.

$N_{PUCCH}^{(e,2)}$ represents a parameter configured by the upper layer and may be provided by RRC. The $N_{PUCCH}^{(e,2)}$ may be configured using one of the methods as follows:

(Method A) Method of Configuring the Same $N_{PUCCH}^{(e,2)}$ for all Terminals

Method A is to configure the same $N_{PUCCH}^{(e,2)}$ for all terminals. For this, a cell-specific parameter that is applied in common to all terminals, among RRC parameters, may be used to inform the terminals. Another method of configuring the same $N_{PUCCH}^{(e,1)}$ for all terminals is to set UE-specific parameters for all terminals to the same value.

(Method B) Method of Configuring $N_{PUCCH}^{(e,2)}$ Using UE-Specific Parameters Method B is to inform terminals of $N_{PUCCH}^{(e,1)}$ using UE-specific parameters. That is, the $N_{PUCCH}^{(e,1)}$ is informed to terminals using UE-specific parameters among RRC parameters. Method B includes a method of grouping terminals into several groups and setting the same value for all terminals belonging to each group.

Next, a case where one or more PDCCHs are transmitted through the same time-frequency resources using several transmission antenna ports or using a part of several possible transmission antenna ports, will be described.

In this case, a plurality of ePDCCHs may include control information of a terminal or control information of a plurality of terminals. A case where the plurality of ePDCCHs are transmitted through the same time-frequency resources using different transmission antenna ports will be first described, below.

It is assumed that ePDCCH including scheduling information for arbitrary PDSCH has been transmitted through a $Q_{ePDCCH}$-th transmission antenna port of a base station.

First, a case of using a transmission antenna port in order to transmit ACK/NACK information with respect to PDSCH scheduled by ePDCCH to PUCCH is described.

In this case, if the transmission antenna port used to transmit PUCCH is $p_0$, a PUCCH resource $n_{PUCCH}^{(1,\tilde{p}=p_0)}$ for the transmission antenna port $p_0$ can be configured according to Equation 7, below:

$$n_{PUCCH}^{(1,\tilde{p}=p_0)} = n_{ePRB}^{(ePDCCH)} + N_{PUCCH}^{(e,2)} + N_{ePDCCH} \cdot A_{PORT} \qquad (7)$$

Meanwhile, Equation 7 corresponds to the method of transmitting ePDCCH for a terminal through a PRB, and if Equation 7 is rewritten by replacing $n_{ePRB}^{(ePDCCH)}$ with $n_{eCCE}^{(ePDCCH)}$, Equation 7 corresponds to the method of transmitting ePDCCH for two or more terminals through a PRB.

In Equation 7, $A_{PORT}$ is information about a transmission antenna port q for the corresponding ePDCCH. A method of setting $A_{PORT}$ is as follows. For example, if a $Q_{ePDCCH}$-th transmission antenna port among all transmission antenna ports that can be used to transmit ePDCCH has been used, $A_{PORT}=(Q_{ePDCCH}-1)$. That is, if the first transmission antenna port has been used, $A_{PORT}=0$.

Also, a method of setting $N_{ePDCCH}$ is to set $N_{ePDCCH}$ to 1. Another method of setting $N_{ePDCCH}$ is for a base station to inform terminals of $N_{ePDCCH}$ through upper layer signaling. At this time, the upper layer signaling may be RRC signaling. When the base station informs terminals of $N_{ePDCCH}$, the base station may inform all the terminals of a common value using a cell-specific parameter, or may inform the respective terminals of UE-specific values using UE-specific parameters.

Now, a case of using two transmission antenna ports $p_0$ and $p_1$ in order to transmit ACK/NACK information with respect to PDSCH scheduled by ePDCCH to PUCCH is described.

In regard of a PUCCH resource $n_{PUCCH}^{(1,\tilde{p}=p_0)}$ for the transmission antenna port $p_0$, the same method used in the case where a transmission antenna port is used, as described above, may be used. That is, the PUCCH resource $n_{PUCCH}^{(1,\tilde{p}=p_0)}$ can be configured according to Equation 8, below:

$$n_{PUCCH}^{(1,\tilde{p}=p_0)} = n_{ePRB}^{(ePDCCH)} + N_{PUCCH}^{(e,2)} + N_{ePDCCH} \cdot A_{PORT} \qquad (8)$$

Equation 8 corresponds, like Equation 7, to the method of transmitting ePDCCH for a terminal through a PRB, and if Equation 8 is rewritten by replacing $n_{ePRB}^{(ePDCCH)}$ with $n_{eCCE}^{(ePDCCH)}$, Equation 8 corresponds to the method of transmitting ePDCCH for two or more terminals through a PRB.

A PUCCH resource $n_{PUCCH}^{(1,\tilde{p}=p_1)}$ for the other transmission antenna port $p_1$ can be configured according to Equation 9, below:

$$n_{PUCCH}^{(1,\tilde{p}=p_1)} = n_{ePRB}^{(ePDCCH)} + M_3 + N_{PUCCH}^{(e,2)} + N_{ePDCCH} \cdot A_{PORT} \qquad (9)$$

In Equation 9, $M_3$ is a constant, and for example, $M_3=1$.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

We claim:

1. A communication method performed by a terminal, comprising:
receiving a first portion of a first time slot;
subsequent to receiving the first portion of the first time slot, receiving a second portion of the first time slot;
subsequent to receiving the second portion of the first time slot, receiving a first portion of a second time slot, wherein the first time slot and the second time slot belong to single subframe, wherein the subframe consists of resource elements arranged in frequency and time domain, the first portion of the first time slot includes a physical downlink control channel (PDCCH), and the second portion of the first time slot and the first portion of the second time slot include a physical downlink shared channel (PDSCH) for data transmission;
determining a location of a search space for a control channel in one of the second portion of the first time slot and the first portion of the second time slot; and
receiving control information through the control channel at least based on the location of the search space.

2. The communication method of claim 1, wherein a slot number of the first time slot is of a first value, a slot number of the second time slot is of a second value different from the first value, and the slot number of the time slot in which the search space is located is used to determine the location of the search space.

3. The communication method of claim 1, further comprising:
before receiving the first subframe, receiving a first message by Radio Resource Control (RRC) signaling, wherein the first message is also used in determining the location of the search space.

4. The communication method of claim 3, wherein the first message comprises information on a starting Orthogonal Frequency Divisional Multiplexing (OFDM) symbol of the search space in the first subframe.

5. The communication method of claim 2, wherein the location of the search space for the control channel is determined using also a Cell-RNTI (C-RNTI) of the terminal.

6. The communication method of claim 1, wherein the control information is transmitted through a first set of physical resource blocks (PRBs), and a first set of Demodulation Resource Signals (DM-RS) are transmitted in the first PRBs,
and the method further comprises:
applying a same precoding to the control information as the DM-RS.

7. A terminal, comprising:
a circuitry which is configured to:
cause the terminal to receive a first portion of a first time slot;
cause the terminal to receive, subsequent to receiving the first portion of the first time slot, a second portion of the first time slot;
cause the terminal to receive, subsequent to receiving the second portion of the first time slot, a first portion of a second time slot, wherein the first time slot and the second time slot belong to a single subframe, wherein the subframe consists of resource elements arranged in frequency and time domain, the first portion of the first time slot includes a physical downlink control channel (PDCCH), and the second portion of the first time slot and the first portion of the second time slot include a physical downlink shared channel (PDSCH) for data transmission;
determine a location of a search space for a control channel in one of the second portion of the first time slot and the first portion of the second time slot; and
cause the terminal to receive control information through the control channel at least based on the location of the search space.

8. The terminal of claim 7, wherein a slot number of the first time slot is of a first value, a slot number of the second time slot is of a second value different from the first value, and the slot number of the time slot in which the search space is located is used to determine the location of the search space.

9. The terminal of claim 7, wherein the circuitry is further configured to:
cause the terminal to, before receiving the first subframe, receive a first message by Radio Resource Control (RRC) signaling, wherein the first message is also used in determining the location of the search space.

10. The terminal of claim 9, wherein the first message comprises information on a starting Orthogonal Frequency Divisional Multiplexing (OFDM) symbol of the search space in the first subframe.

11. The terminal of claim 8, wherein the location of the search space for the control channel is determined using also a Cell-RNTI (C-RNTI) of the terminal.

12. The terminal of claim 7, wherein the control information is transmitted through a first set of physical resource blocks (PRBs), and a first set of Demodulation Resource Signals (DM-RS) are transmitted in the first PRBs,
and the circuitry is further configured to:
cause the terminal to apply a same precoding to the control information as the DM-RS.

13. A communication device for a terminal, the communication device comprising:
a circuitry which is configured to:
cause the terminal to receive a first portion of a first time slot;
cause the terminal to receive, subsequent to receiving the first portion of the first time slot, a second portion of the first time slot;
cause the terminal to receive, subsequent to receiving the second portion of the first time slot, a first portion of a second time slot, wherein the first time slot and the second time slot belong to a single subframe, wherein the subframe consists of resource elements arranged in frequency and time domain, the first portion of the first time slot includes a physical downlink control channel (PDCCH), and the second portion of the first time slot and the first portion of the second time slot include a physical downlink shared channel (PDSCH) for data transmission;
determine a location of a search space for a control channel in one of the second portion of the first time slot and the first portion of the second time slot; and
cause the terminal to receive control information through the control channel at least based on the location of the search space.

14. The communication device of claim 13, wherein a slot number of the first time slot is of a first value, a slot number of the second time slot is of a second value different from the first value, and the slot number of the time slot in which the search space is located is used to determine the location of the search space.

15. The communication device of claim 13, wherein the circuitry is further configured to:
  cause the terminal to, before receiving the first subframe, receive a first message by Radio Resource Control (RRC) signaling, wherein the first message is also used in determining the location of the search space.

16. The communication device of claim 15, wherein the first message comprises information on a starting Orthogonal Frequency Divisional Multiplexing (OFDM) symbol of the search space in the first subframe.

17. The communication device of claim 14, wherein the location of the search space for the control channel is determined using also a Cell-RNTI (C-RNTI) of the terminal.

18. The communication device of claim 13, wherein the control information is transmitted through a first set of physical resource blocks (PRBs), and a first set of Demodulation Resource Signals (DM-RS) are transmitted in the first PRBs,
  and the circuitry is further configured to:
  cause the terminal to apply a same precoding to the control information as the DM-RS.

* * * * *